United States Patent
Waisanen

[15] 3,634,918
[45] Jan. 18, 1972

[54] WEDGE LOCK FASTENER FOR CUTTING TOOLS

[72] Inventor: Oliver T. Waisanen, 1003 Hickory, Royal Oak, Mich. 48067

[22] Filed: Oct. 10, 1969

[21] Appl. No.: 865,413

[52] U.S. Cl. ............................................. 29/105, 29/103 A
[51] Int. Cl. ................................................... B26d 1/12
[58] Field of Search ........................... 29/105, 103 A, 105 A

[56] References Cited

UNITED STATES PATENTS 2,245,446   6/1941   Sheldrick ............................. 29/105

FOREIGN PATENTS OR APPLICATIONS

| 680,443 | 8/1939 | Germany | 29/105 |
| 371,322 | 9/1963 | Switzerland | 29/105 A |
| 935,750 | 9/1963 | Great Britain | 29/105 |
| 607,265 | 10/1960 | Canada | 29/105 |

Primary Examiner—Harrison L. Hinson
Attorney—Farley, Forster and Farley

[57] ABSTRACT

Means for retaining and actuating a wedge-locking member in a cutting tool, to hold a throwaway cutting insert blade, and which includes a T-slot under the wedge for an inverted fastener that has threaded engagement with the wedges and allows self-alignment of the wedge as applied.

8 Claims, 6 Drawing Figures

PATENTED JAN 18 1972
3,634,918
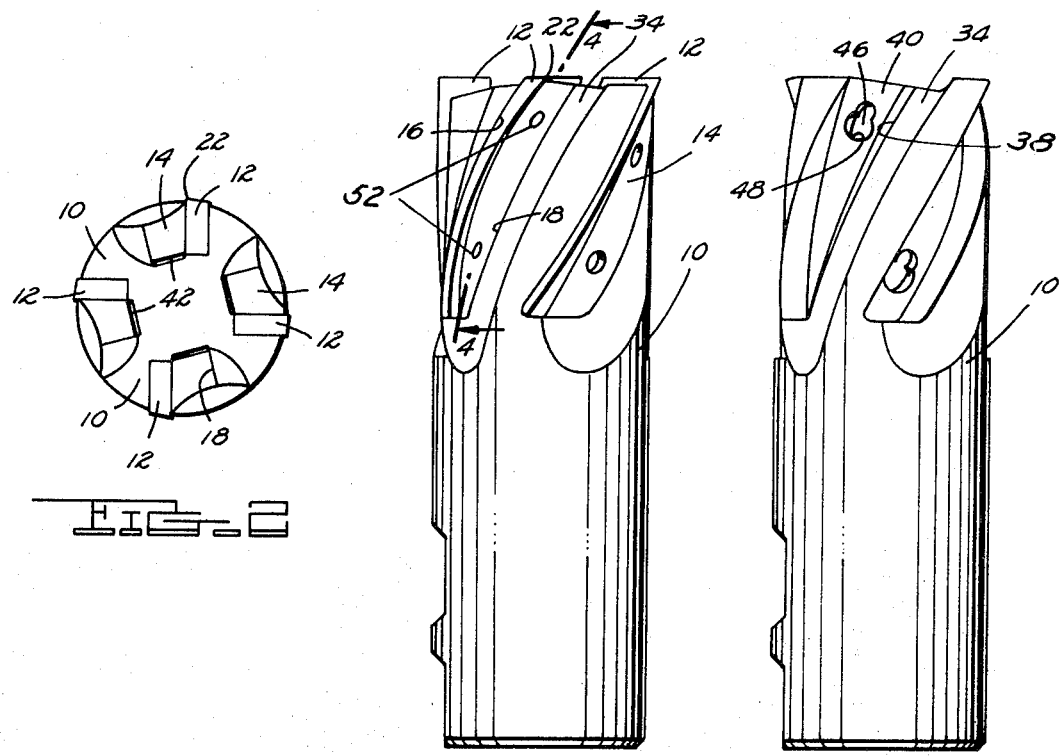
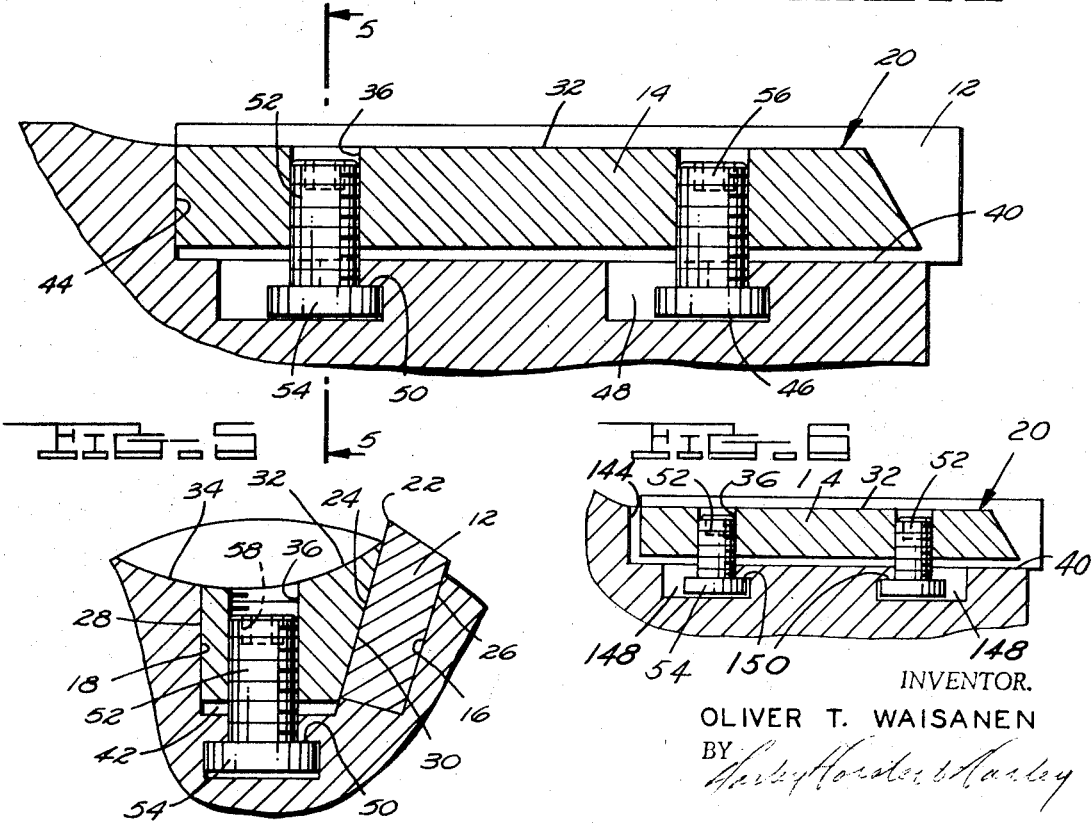
INVENTOR.
OLIVER T. WAISANEN
BY
ATTORNEYS

WEDGE LOCK FASTENER FOR CUTTING TOOLS

BACKGROUND OF THE INVENTION

In small-sized helical end mills, which use wedges to hold the cutting blades in the tool body, the normal type of wedge fastener is difficult to use.

There is not much tool stock at the center of the holder body for a screw hole of any appreciable depth and if different fastener holes, for different wedges, are in the same axial plane they may intersect. At the same time, if the fastener holes for different wedges are in different locations, then the wedges must be qualified for use in certain wedge slots and they cannot be used in others.

Another problem arises if the helix angle of the tool is very large. The wedges must be able to shift lengthwise a substantial amount as they are pulled down to hold the cutting blades. With lesser helix angles, an oversized dimensioning of the threaded holes relative to the fastener will usually allow the float needed, but this is poor design and will not always work.

In some helical mills, a hole is bored clear through the holder body, between wedge slots on opposite sides, and a common fastener is used to hold and actuate both wedges. Although the through hole can usually be sufficiently oversized to allow for enough wedge float to compensate for most helix angles, there is a problem in assembly, in the clamping pressure applied by such means, and the through holes. The through holes must be staggered so that they will not intersect, which again introduces the problem of qualifying the wedges with the receptive slots.

SUMMARY OF THE PRESENT INVENTION

This invention relates to a wedge fastener for use in cutting tools and one which is particularly well-suited for use in small-sized helical end mills.

The fastener means include a small threaded member, with a head at one end, which is inverted in a wedge slot and has its head held in a T-slot in the bottom of the wedge slot so that it can be freely turned. The threaded end is brought into threaded engagement with a wedge-locking member.

The accessible ends of the T-slots are towards the closed ends of the wedge slots so that once the wedges are engaged by the fastener means the wedges themselves prevent the fastener means from becoming disengaged.

The T-slots in the bottom of the wedge slots may be relatively shallow and need not be made to any close tolerance dimensions. In fact, they should allow for sufficient free movement, or float, of the upended fasteners to permit self-adjustment of the wedges as they are pulled down and caused to shift, due to the helix angle of the slot walls.

These and other objects and advantages to be gained in the practice of the present invention will be better understood and more fully appreciated upon a reading of the specification which follows hereinafter and is directed to a working embodiment of the present invention.

DESCRIPTION OF THE DRAWINGS

FIG. 1 is a side elevation of a helical end mill with the wedge fastener means of the present invention;

FIG. 2 is an end view of the cutting tool shown in FIG. 1;

FIG. 3 is similar to FIG. 1 but with the wedges and cutting blades removed to better show the T-slots in the bottom of the wedge receptive slots.

FIG. 4 is an enlarged cross-sectional view of the wedge and its fastener means, as seen in the plane of line 4—4, which follows the helix angle of the wedge slots in FIG. 1;

FIG. 5 is a cross-sectional view of the wedge and its fastener means as seen in the plane of line 5—5 in FIG. 4;

FIG. 6 is a cross section showing an alternate form of the invention utilizing opposed T-slots

DETAILED DESCRIPTION OF ILLUSTRATED EMBODIMENT

Although the present invention may have use and be applicable in other cutting tools, it has been found particularly useful in small-sized helical end mills and is best described in use therewith.

The accompanying drawings show a helical end mill 10 which has cutter blades or inserts 12, that are helical in form, and which are held by wedges 14 that are also helical in form, and which are held by wedges 14 that are also helical in shape and, in the present instance, are disposed in front of the cutter blades. Each is received, respectively in adjacent blade and wedge slots 16 and 18 that are formed in the cutter body. The wedges 14 are retained by fastener means 52.

The cutter blades 12 are of the throwaway insert type ground to provide a cutting edge 22 on the wedge-engaging sidewall 24 thereof and opposite the wall-engaging side face 26 opposite thereto. The depth of the cutter blades is in accord with the depth of the blade receptive slot 16 and as is necessary to expose the cutting edge 22 beyond the periphery of the cutter body for its intended cutting purposes.

The wedges 14 are helical in shape, as mentioned, and include sidewalls 28 and 30 which converge together towards the bottom wall of the wedge and relatively from the face wall 32, which is formed to comply with the chip recess 34 provided in the cutter body in front of each cutter blade. The wedges are provided with threaded holes 36 near opposite ends with which the fastener means 52 are engaged to hold the wedges in the tool body.

The wedge slot 18 includes the wedge-engaging sidewall 38 against which the wedge acts, and a bottom wall 40. The wedge never engages this bottom wall, since the wedge would be ineffective if it did, and there is normally a clearance space 42 under the wedge as is best shown in FIG. 2. The end or terminal wall 44 of the wedge slot serves as a shoulder stop which prevents the fastener means from becoming disengaged from the tool body, as will hereinafter be described.

The wedge and fastener combination 20 of the present invention are best shown in FIGS. 3–5.

T-slotted openings 46 are provided in the bottom slot wall 40. They are enlarged at one end, as at 48, to provide access, and are undercut, as at 50, at the other end. This enables threaded fasteners 52 to have their headed ends 54 received through the enlarged end 48 of the T-slotted openings and to be disposed so that they may be held in the undercut ends 50 thereof while their threaded ends 56 are turned up for engagement within the threaded holes 36 in the wedges 14.

As will be appreciated, socket recesses 58 in the up-turned ends 56 of the threaded fasteners enable them to be turned and brought into threaded engagement with the wedges.

Reasonable clearance is provided within the T-slotted openings 46 to allow for self-adjustment and relatively free fore and aft movement of the threaded fastener 52, as well as some lateral movement of its threaded end, so that the wedge members 14 have some "float" as is necessary in being pulled down and applied within the helical wedge slots.

The particular end mill 10 that is shown and is being described, has four cutter blades 12 in receptive slots 16 circumferentially spaced about the cutter body and with their cutting edges 22 exposed beyond the outer periphery of the cutter body.

The wedges 14 are assembled in the wedge slots 18 by first putting the threaded fasteners 52, heads down, in the T-slotted openings 46 and then lining up the wedges over the fasteners so that the threaded ends 56 may be engaged in the threaded holes 36 provided within the wedges.

Two separate threaded fasteners 52 are provided for each wedge 14 in each of the wedge slots 18. One is disposed near each end of the wedges and since the T-slots are relatively shallow, each can be disposed in the same axial location in its respective wedge slot. This is particularly significant in that the wedges and screws can be interchanged between different wedge slots and each is able to provide a like wedge pressure near the cut-initiating ends of the blades; which is not possible with fastener means that must be staggered to avoid intersecting within the cutter body.

The T-slotted under cutting 50, in the openings 46, runs relatively parallel to the bottom slot wall and allows the wedges, as loosely retained, to have relative though limited freedom to shift a little fore and aft as well as laterally; particularly as is necessitated by the curvature of the helical walls with which the wedge is engaged as it is pulled down into the wedge slot. However, it will be noted that the terminal or end wall 44 of the wedge slots 18 precludes disengagement of the wedges from the slots when they are engaged by the threaded fasteners 52. Such end walls serve as shoulder stops which prevent backing the wedges sufficiently far enough back into the wedge slots for their headed ends 54 to come into the enlarged ends 48 of the T-slots, from where they may be removed.

In FIG. 6 an alternate embodiment has the openings 146 opposed. The T-slotted undercuttings 150 extend toward each other and with the threaded fasteners 52 engaged in the wedge 14 as shown the heads 54 cannot pass through the enlarged openings 148. The end wall 144 need not engage the wedge 14 in this embodiment.

The wedge-clamping arrangement shown here is particularly suited for use with helical end mills, as has been discussed, but is not precluded from use elsewhere. In this respect, the end view illustration of FIG. 5 will bring to mind other instances where T-slot fasteners for wedge or other clamps might be used. And, as long as the access to the T-slots is at the end or side towards a shoulder wall, or opposed to prevent disassembly when the wedge is in threaded engagement, one of the important features of this invention will be obtained.

I claim:

1. In a cutting tool which uses cutting inserts and which includes insert retaining means held to a cutter body and actuated by headed threaded fastener means, the improvement, comprising;
   at least one T-slot in the cutter body for engaging and retaining said fastener means thereto, access means for admitting the head of a fastener means into said T-slot before engagement with said insert retaining means,
   integral stop means in the cutter body preventing sufficient movement of the insert retaining means to disengage said fastener means from said T-slot following engagement of said insert retaining means with said fastener means,
   said retaining means including a wedge and said stop means including a wedge-engaging cutter body wall, and
   a wedge slot having said T-slot formed therein, said wedge-engaging cutter body wall including an end wall of said wedge slot.

2. In a cutting tool which uses cutting inserts and which includes insert retaining means held to a cutter body and actuated by headed threaded fastener means, the improvement, comprising;
   at least one T-slot in the cutter body for engaging and retaining said fastener means thereto, access means for admitting the head of a fastener means into said T-slot before engagement with said insert retaining means,
   integral stop means in the cutter body preventing sufficient movement of the insert retaining means to disengage said fastener means from said T-slot following engagement of said insert retaining means with said fastener means,
   said retaining means including a wedge slot in said cutter body and a wedge disposed therein, plural T-slots formed in said wedge slot engaging plural fastener means, and said integral stop means comprising oppositely directed retaining portions of said T-slots 3. In an end mill including next adjacent insert and wedge slots in said end mill body and having a cutting insert and a retaining wedge member disposed respectively therewithin, the improvement comprising;
   a T-slot in the bottom wall of said wedge slot,
   threaded fastener means engaged and retained in said T-slot and having threaded engagement with said wedge member, and
   integral stop means in said end mill body to prevent disengagement of said fastener means from said T-slot while said fastener means is engaged with said wedge member.

4. The end mill improvement of claim 2,
   said stop means including a wall at the end of said wedge slot for interference engagement with said wedge member.

5. A helical end mill including a plurality of helical blades retained by helical wedges in helical wedge slots and comprising;
   T-slots in the bottom wall of said wedge slots,
   fasteners engaged in said T-slots and having threaded engagement with said wedges, and
   walls at the ends of said wedge slots preventing sufficient movement of said wedges to disengage said fasteners from said T-slots during insertion or removal of said helical blades.

6. The helical end mill of claim 5,
   at least some of said T-slots being axially disposed in a common transverse plane in the bottom walls of said wedge slots and being accessible from like ends of said wedge slots through the bottom walls thereof.

7. A cutting tool having a plurality of cutting insert retaining means, said retaining means including wedge slots in said cutting tool, wedges in said wedge slots, plural fastener means engaging each of said wedges, T-slots formed in said wedge slots and engaging said fastener means, and stop means formed in said wedge slots to prevent disengagement of said fastener means from said T-slots while engaged in said wedges, said stop means including wedge slot end walls.

8. The cutting tool of claim 7, wherein said stop means comprise oppositely directed retaining portions of said T-slots.

* * * * *